United States Patent [19]

Fuller

[11] 4,156,713

[45] * May 29, 1979

[54] PRODUCTION OF CHLORINE DIOXIDE

[75] Inventor: Willard A. Fuller, Grand Island, N.Y.

[73] Assignee: Hooker Chemicals & Plastics Corp., Niagara Falls, N.Y.

[ * ] Notice: The portion of the term of this patent subsequent to Aug. 17, 1993, has been disclaimed.

[21] Appl. No.: 836,103

[22] Filed: Sep. 23, 1977

Related U.S. Application Data

[63] Continuation of Ser. No. 689,407, May 24, 1976, abandoned, continuation-in-part of Ser. No. 532,666, Dec. 13, 1974, Pat. No. 3,975,505.

[51] Int. Cl.$^2$ ............................................. C01B 11/02
[52] U.S. Cl. ................... 423/478; 423/479; 423/480
[58] Field of Search ............... 423/478, 480, 500, 505, 423/552, 551, 658.5, 193; 23/270 R; 134/25

[56] References Cited

U.S. PATENT DOCUMENTS

| | | | |
|---|---|---|---|
| 2,426,839 | 9/1947 | Morris | 23/270 R |
| 3,390,402 | 6/1968 | Georg | 23/270 R |
| 3,468,633 | 9/1969 | Honchar | 23/270 R |
| 3,816,077 | 6/1974 | Fuller et al. | 423/480 |
| 3,933,988 | 1/1976 | Rosen | 423/480 |
| 3,975,505 | 8/1976 | Fuller | 423/478 |

OTHER PUBLICATIONS

Mellor, *Inorganic and Theoretical Chemistry*, vol. II, Longmans Green Co., N.Y. (1922), p. 685.

*Primary Examiner*—Brian Hearn
*Attorney, Agent, or Firm*—Peter F. Casella; Howard M. Ellis

[57] ABSTRACT

There is provided an improved process for the production of chlorine dioxide wherein an alkali metal chlorate a reducing agent, and a mineral acid are reacted in a vessel, and the salt crystals are separated from the generator crystal slurry.

7 Claims, 2 Drawing Figures

PRODUCTION OF CHLORINE DIOXIDE

This application is a continuation of Ser. No. 689,407 filed 5/24/76 now abandoned, which is a continuation-in-part application of Ser. No. 532,666, filed Dec. 13, 1974 now U.S. Pat. 3,415,505 issued Aug. 7, 1976.

This invention relates to chlorine dioxide and chlorine production. More particularly, this invention relates to improvements in a method for treating sulfur-containing effluent emanating from chlorine dioxide generators.

Inasmuch as chlorine dioxide is of considerable commercial importance in the areas of pulp bleaching, water purification, fat bleaching, removal of phenols from industrial wastes, textile bleaching, and the like, it is very desirable to provide processes by which chlorine dioxide can be economically generated.

One of the means for generating chlorine dioxide is by the reaction of alkali metal chlorate, alkali metal chloride reducing agent, and a mineral acid. Preferably, in such processes, the alkali metal chlorate employed is sodium chlorate, the alkali metal chloride is sodium chloride, and the mineral acid is sulfuric acid or a mixture of sulfuric acid with other mineral acids such as phosphoric acid or hydrochloric acid. Such reactions as occur are exemplified by the following:

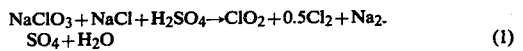  (1)

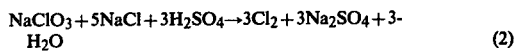  (2)

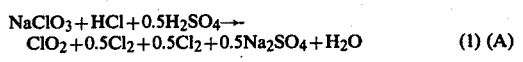  (1) (A)

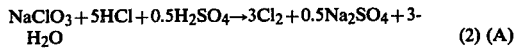  (2) (A)

Such reactions are employed commercially, with the reactants continuously fed into a reaction vessel and the chlorine dioxide and chlorine produced therein continuously removed from the reaction vessel.

Reactions (1) and (1) (A), which are favored inasmuch as they produce primarily chlorine dioxide, result from the use of about equimolar amounts of chlorate and chloride.

Similarly, a methanol or sulfur dioxide reducing agent can be used wherein it reacts with the byproduct chlorine to furnish the required $H_2SO_4$ and/or $HCl$.

A single vessel process for producing chlorine dioxide is set forth in U.S. Pat. No. 3,563,702 wherein alkali metal chlorate, an alkali metal chloride and a mineral acid solution are continuously fed to a single vessel generator-evaporator-crystallizer in proportions sufficient to generate chlorine dioxide, at a temperature of from about 50° to about 100° C. and an acidity in the generator of from about 2 to about 5 normal, removing water from the reaction system by vacuum-induced evaporation, conducted under a vacuum of from about 100 to about 400 millimeters of mercury absolute to effect evaporation of water vapor, with concurrent withdrawal of chlorine dioxide, crystallizing the neutral alkali metal salt of the mineral acid within the generator-evaporator-crystallizer and withdrawing the crystals as a slurry from the generator.

In those reaction systems wherein the acid normality is maintained between about 2 and 5, the reaction may be conducted in the presence of a relatively small amount of a catalyst such as those selected from the group consisting of vanadium pentoxide, silver ions, manganese ions, dichromate ions and arsenic ions.

As the reaction producing the chlorine dioxide occurs within the generator, in reactions where sulfuric acid is utilized as the mineral acid reactant, crystals of sodium sulfate, acid sodium sulfate and/or sodium sulfate hydrates, in amounts and presence dependent generally upon the acid concentration used, are crystallized out and settle to the bottom of the generator from whence they are withdrawn in the form of a slurry.

Generally, past techniques for processing the withdrawn slurry have involved processes such as contrifugal separation, filtration and other standard separation techniques. Mother liquors and water, which where employed in such separatory procedures, may or may not be returned to the generator.

However, such crystal slurry treatment processes have not been totally satisfactory in the single vessel process due to maintainance problems, the requirements for additional steam sources to operate the filter and more importantly, filtration does not return, at substantially high efficiency to the reactor, chlorate and chloride values present in the withdrawn crystal slurry.

The single vessel process can also be conducted at high acid normalities, with the acid normality in the generator maintained at levels between about 4 and about 10 normal. Certain advantages accrue in maintaining the reaction at such high acid levels. The concentration of the more expensive chlorate is reduced by a factor up to about 10 over the requirements of the low acid concentration process. The lower chlorate concentration allows for quick and economical startup, stopping, and rate adjustment of the system. Also, importantly, the requirement for the presence of a catalyst is obviated, and losses due to entrainment, spillage and the like are minimized.

Generally, when the acid concentration in the generator is maintained on the low side, i.e., from about 2 to about 5 normality, the slurry contains chlorate, chloride values, sulfuric acid and crystalline sodium sulfate.

Generally, when the acid concentration in the generator is maintained on the high side, i.e., from about 4 to about 12 normality, e.g. about 10 the slurry contains chlorate and chloride values, sulfuric acid and acid sodium sulfate.

It is an object of the present invention to provide an improved process for the treatment of the crystal slurry produced in single vessel chlorine dioxide production, efficiently separate the crystalline constituents therefrom and to recover substantially all of the chlorate, chloride and sulfuric acid values for return to the generator for further reaction.

In accordance with the present invention, single vessel process slurry is introduced into the top of a separatory column, water, preferably at a temperature of from about 30° to about 70° C., is added continuously via an inlet located near the bottom of the separatory column in countercurrent flow to the downward flow of the slurry, with the crystals contained in the downward flowing slurry continuously washed by the water, and the crystals removed as aqueous slurry via an outlet located near the bottom of the separatory column.

By the present process, the efficiency of the chlorlre dioxide generating system is increased, essentially all of the chloride, chlorate values and mineral acid being returned in a continuous washing to the generator and less energy is required in operating the system. Additionally, in those systems wherein the generator is operated under high acid concentrations, the sodium sulfate is recovered as neutral sodium sulfate, as opposed to the undesirable acid sodium sulfates recovered by slurry filtration techniques.

The size of the separatory column may be on the order of 6–24" in diameter and 10–15' or longer, dependent primarily on the size of the generator employed.

The rates of flow of slurry and water are adjusted so as to provide a maximum washing efficiency without substantially increasing the steam requirements for the vacuum evaporation in the generator, generally about 0.2 to about 4 pounds of water per each pound of sodium sulfate produced continuing into the generator and the remaining water sufficient to continuously remove the sodium sulfate as a flowable slurry from the separatory column. The slurry of crystalline sodium sulfate may be removed and utilized, e.g. by pumping to a mill digestor liquor system or dissolved in kraft mill black liquor.

Though the process of the present invention is particularly suitable to a single vessel chlorine dioxide generating process but is not limited to such and may be readily adapted to a chlorine dioxide generating system wherein the spent generator slurry is crystallized in a separate vessel by providing transport of the recovered chlorate, chloride and sulfuric acid values to the generator.

BRIEF DESCRIPTION OF DRAWINGS

FIGS. 1 and 2 are schematic vertical elevations.

DETAILED DESCRIPTION OF DRAWINGS

Figure 1:
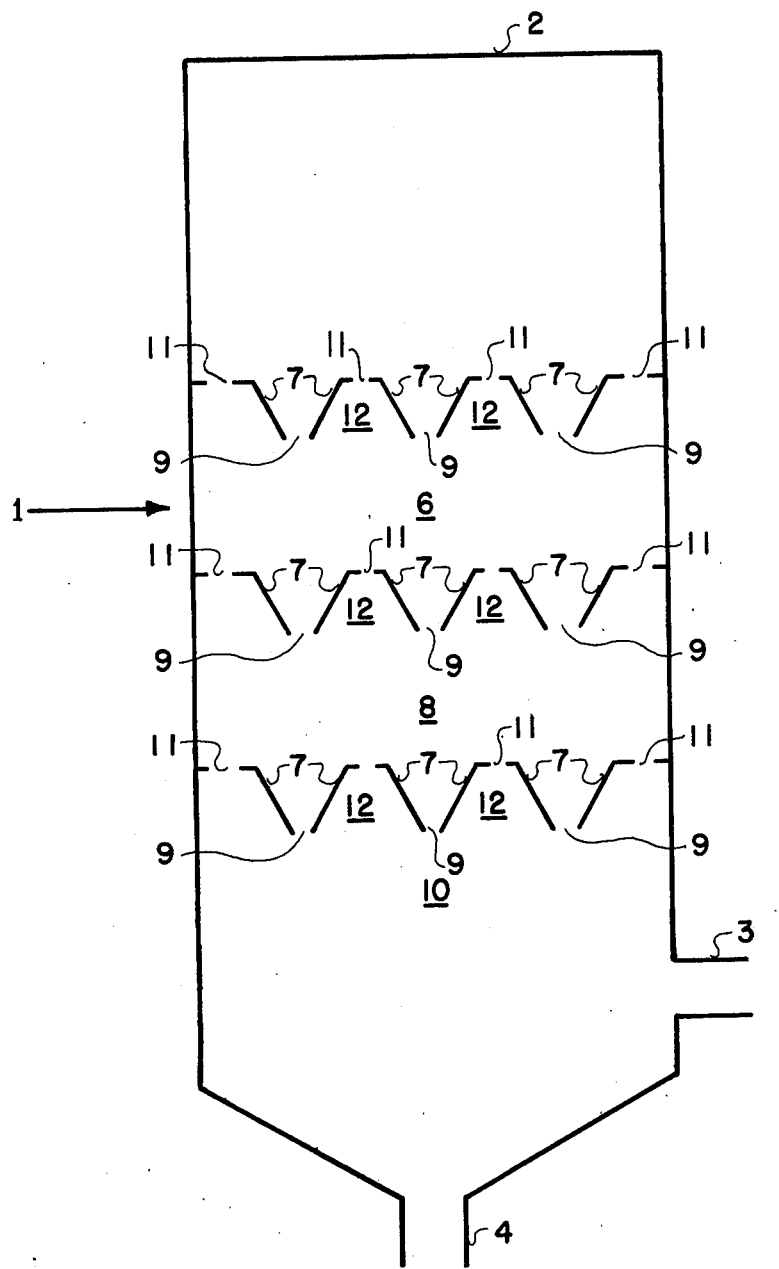
FIGS. 1 and 2 are illustrative of the separatory columns which are advantageously employed in the process of the present invention.

FIG. 1 is illustrative of a separatory column which is advantageously employed in the process of the present invention. The apparatus is a separatory column or tower 1 made of any suitable construction materials, such as for example, titanium, plastics, ceramics, or the like. The column is preferably, although not necessarily, substantially cylindrical having an inlet means 2 at the upper portion thereof for the introduction of crystal slurry from the single vessel reactor (not shown). The lower portion of the column is provided with a hot water inlet 3 and a washed crystal takeoff means 4. Column 1 is divided into multiple treatment zones 6, 8, 10, etc. by plates incorporating at least one and preferably multiple downwardly tapering funnel-shaped configurations 7 having openings 9 at the apex for discharging crystal slurry downward into turbulent washing zones 6, 8, 10 etc. the flow of crystal-containing slurry directed downwardly from plate to plate, and succeeding turbulent washing zones.

Each plate is provided with multiple apertures 11 located at or near the junction of the uppermost portion of the funnel-shaped configuration and the plate. As the crystal containing slurry moves downward onto the plate and through the opening 9, the upcoming flow of hot water is diverted in part through openings 11, setting up a circulatory flow around and in the funnel shaped configuration, creating turbulence in the zones immediately below the openings 9, continuously freeing the sulfate crystals from chlorate, chloride and sulfuric acid values and continuously permitting the downward passage of sodium sulfate for removal via outlet 4 and passage to the generator. Control of the downward flow of the crystals and the extent of the turbulence is conveniently effected by adjusting the relative sizes of the openings 9 and 11.

Zone 12 of the apparatus is a relatively non-turbulent zone wherein the crystals settle by gravity and are not carried by rising liquid to the zone above.

The column may be located immediately below the generator in which instance the crystal slurry moves by gravity flow from the generator (not shown) into the column via inlet 2. Chlorate, chloride and sulfuric acid values are continuously returned directly to the generator in that portion of the wash water directed by upward flow into the generator. In those instances where space and other factors dictate the placement of the column at a site adjacent to or remote from the generator, the crystal slurry is pumped by suitable pumping means (not shown) to the column via inlet 2.

The total number of plates situated in the column may be varied, depending generally upon the size of the generator, amounts of crystal slurry to be handled in a given time period, space considerations. Generally, in operations where standard generators are used with a capacity of about 6000 gallons, columns of about 10–15 feet in length, 2–3 feet in diameter having 8–12 plates situated approximately one foot apart are suitable.

In those instances where space and other factors dictate the placement of the separatory column at a site adjacent the single vessel generator, crystal-containing slurry removed from the bottom of the generator is pumped by suitable pumping means (not shown) to the top of the separatory column and the wash water containing chlorate, chloride and sulfuric acid values returned from zone 10 of the separatory column to the generator via suitable outlet and conveying means (not shown).

Figure 2:
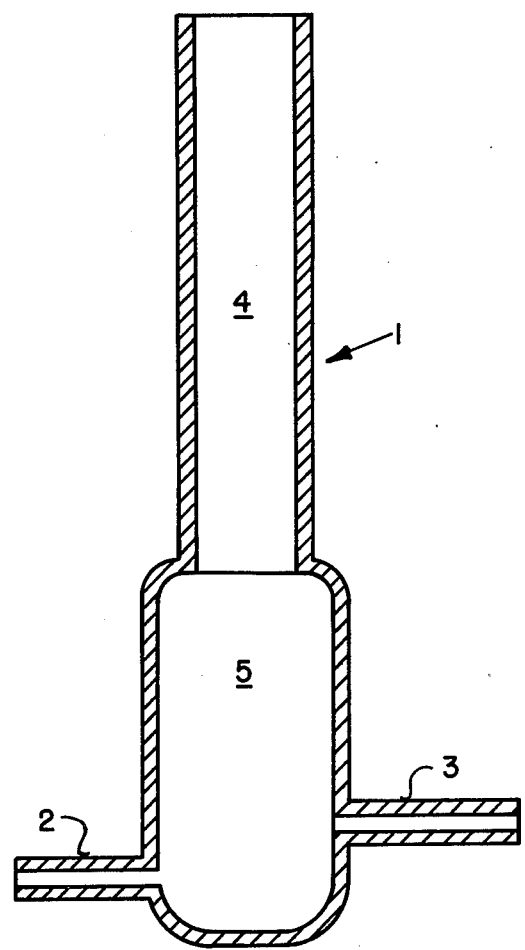

FIG. 2 represents another separatory column useful in the process of the present invention. The separatory column, as with the separatory column of FIG. 1, may be situated either adjacent to or immediately below the single vessel generator. In those instances where the separatory column is located immediately below the single vessel generator, crystal slurry is continuously moved from the bottom of the generator (not shown) to the top of the column 1 at zone 4. Hot wash water is continuously admitted to the column via 2 and flows upwardly through the column, continuously washing the down flowing crystals, and continuously returning the chlorate, chloride and sulfuric acid values removed therefrom to the generator from the top of the column. The washed crystals move downward into a crystal collection zone 5 from whence they are removed via outlet 3. Outlet 3, shown as located at a point on the column 1 above the hot water inlet 2 may be varied in position near the bottom of the column.

As with the column in FIG. 1, this separatory column can also be situated adjacent the single vessel reactor, in which instance pumping means are provided to continuously feed the crystal slurry from the generator to the separatory column, and the water containing the removed chlorate, chloride and sulfuric acid values continuously removed from the top of the column and returned continuously to the generator via suitable pumping and inlet means.

Utilizing the process of the present invention, it was found that the amount of chlorate, chloride and sulfuric acid values remaining in the recovered sulfate were approximately 0.2 to about 0.25 that remaining in the sulfate when attempting standard separatory techniques with filters. Additionally, utilizing the process of the present invention, where the single vessel generator is operated at high acid normalities, the undesirable acid sulfates produced are converted into neutral sodium sulfate during the washing, not possible when utilizing filter or centrifuge-type separatory procedures.

I claim:

1. In a process for continuously generating a mixture containing chlorine dioxide, chlorine and a neutral alkali metal salt wherein
    (a) an alkali metal chlorate, a reducing agent and a strong mineral acid selected from the group consisting of sulfuric acid and mixtures of sulfuric acid and a member of the group consisting of hydrochloric and phosphoric acid are continuously reacted in a single vessel generator-evaporator-crystallizer in proportions to generate chlorine dioxide;
    (b) the temperature is maintained at between about 50° and about 100° C.;
    (c) the acidity of the reaction solution is maintained within the range of from about 4 to about 12 normal;
    (d) the reaction solution is subjected to a vacuum of from about 100 to about 400 millimeters of mercury absolute to effect evaporation of water vapor;
    (e) chlorine dioxide and any chlorine produced by said reaction solution is withdrawn in admixture with said water vapor; and
    (f) acid alkali metal salt of said mineral acid is crystallized within said generator-evaporator-crystallizer and continuously withdrawn therefrom in the form of an aqueous slurry containing minor amounts of chlorate, reducing agent and acid values;
    the improvement which comprises continuously passing the slurry containing acid alkali metal salt crystals produced in said generator-evaporator-crystallizer into the top of a separating column, in a downward flow;
    countercurrently passing a stream of water continuously upwardly through said column at a rate sufficient to effect washing of the downward flowing crystals and conversion of said crystals to neutral alkali metal salt, whereby chlorate, reducing agent and acid values recovered therefrom are continuously and substantially completely returned to said generator-evaporator-crystallizer; and
    continuously removing an aqueous slurry of substantially pure neutral alkali metal salt crystals from the bottom of said separating column.

2. The process as defined by claim 1 wherein the mineral acid is sulfuric acid, the alkali-metal chlorate is sodium chlorate and the reducing agent is sodium chloride.

3. The process of claim 1 wherein the reducing agent is selected from methanol and sulfur dioxide.

4. The process of claim 3 when sulfur dioxide is utilized as a reducing agent and is introduced to the process in the separatory column.

5. The process as defined by claim 1 wherein the reaction is conducted at an acid normality of about 10.

6. The process as defined by claim 1 wherein the temperature of the wash water is maintained at from about 30° to about 70° C.

7. The process as defined by claim 1 wherein the wash water is continuously fed into the separatory column at a rate sufficient to provide from about 0.2 to about 4 pounds of water per each pound of alkali metal salt crystals produced in said generator-evaporator-crystallizer.

* * * * *

UNITED STATES PATENT OFFICE
CERTIFICATE OF CORRECTION

Patent No. 4,156,713  Dated May 29, 1979

Inventor(s) Willard A. Fuller

It is certified that error appears in the above-identified patent and that said Letters Patent are hereby corrected as shown below:

Column 1, line 6, "U.S. Patent 3,415,505 issued August 7, 1976" should read -- 3,975,505, issued August 17, 1976 --.

Signed and Sealed this

Second Day of October 1979

[SEAL]

Attest:

RUTH C. MASON
Attesting Officer

LUTRELLE F. PARKER
Acting Commissioner of Patents and Trademarks